United States Patent
Cordier

(10) Patent No.: US 10,425,173 B2
(45) Date of Patent: *Sep. 24, 2019

(54) METHOD FOR A PHASE CALIBRATION IN A FRONTEND CIRCUIT OF A NEAR FIELD COMMUNICATION DEVICE

(71) Applicant: STMicroelectronics International N.V., Schiphol (NL)

(72) Inventor: Nicolas Cordier, Luynes (FR)

(73) Assignee: STMicroelectronics International N.V., Schiphol (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,055

(22) Filed: May 24, 2018

(65) Prior Publication Data

US 2018/0269997 A1 Sep. 20, 2018

Related U.S. Application Data

(63) Continuation of application No. 15/438,156, filed on Feb. 21, 2017, now Pat. No. 9,985,732, which is a (Continued)

(30) Foreign Application Priority Data

Aug. 27, 2014 (EP) .................... 14182509

(51) Int. Cl.
*H04B 17/21* (2015.01)
*G06K 7/00* (2006.01)
(Continued)

(52) U.S. Cl.
CPC .......... *H04B 17/21* (2015.01); *G06K 7/0095* (2013.01); *G06K 7/10237* (2013.01);
(Continued)

(58) Field of Classification Search
CPC ..... H04B 17/21; H04B 5/0062; G06K 7/0095
(Continued)

(56) References Cited

U.S. PATENT DOCUMENTS

| 9,985,732 B2* | 5/2018 | Cordier ............... G06K 7/0095 |
| 2013/0288599 A1 | 10/2013 | Bernard et al. |
| 2014/0003548 A1 | 1/2014 | Lefley |

FOREIGN PATENT DOCUMENTS

| EP | 2431925 A1 | 3/2012 |
| EP | 2680457 A2 | 1/2014 |

OTHER PUBLICATIONS

Stark, M. et al., "How to guarantee Phase-Synchronicity in Active Load Modulation for NFC and Proximity," IEEE 2013 5th International Workshop on Near Field Communication (NFC), Feb. 5, 2013, pp. 1-6.

* cited by examiner

*Primary Examiner* — Lee Nguyen
(74) *Attorney, Agent, or Firm* — Slater Matsil, LLP

(57) ABSTRACT

A method for a phase calibration in a frontend circuit of a near field communication (NFC) tag device is disclosed. An active load modulation signal is generated with a preconfigured value of a phase difference with respect to a reference signal of an NFC signal generator device. An amplitude of a test signal present at an antenna of the NFC tag device is measured. The test signal results from overlaying of the reference signal with the active load modulation signal. The following steps are repeated: modifying the value of the phase difference, providing the active load modulation signal with the modified value of the phase difference, measuring an amplitude of the test signal and comparing the measured amplitude with the previously measured amplitude until the measured amplitude fulfills a predefined (Continued)

condition. The value of the phase difference corresponding to the previously measured amplitude is stored.

20 Claims, 11 Drawing Sheets

Related U.S. Application Data continuation of application No. PCT/EP2015/065352, filed on Jul. 6, 2015.

(60) Provisional application No. 62/040,983, filed on Aug. 22, 2014.

(51) Int. Cl.
*H04B 5/00* (2006.01)
*G06K 7/10* (2006.01)

(52) U.S. Cl.
CPC ......... *H04B 5/0031* (2013.01); *H04B 5/0056* (2013.01); *H04B 5/0062* (2013.01)

(58) Field of Classification Search
USPC ....................................................... 455/41.1
See application file for complete search history.

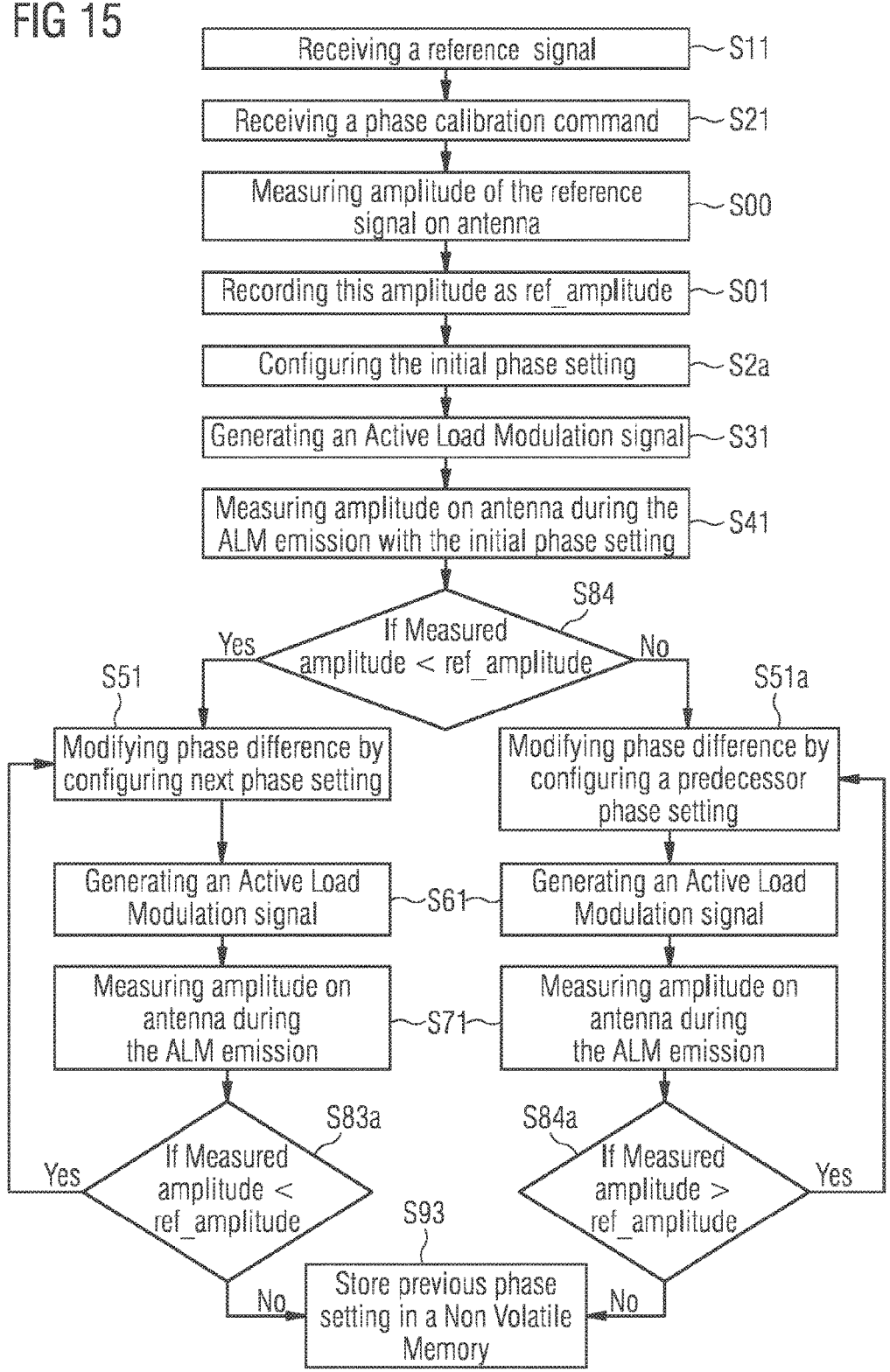

METHOD FOR A PHASE CALIBRATION IN A FRONTEND CIRCUIT OF A NEAR FIELD COMMUNICATION DEVICE

CROSS-REFERENCE TO RELATED APPLICATIONS

This application is a continuation of U.S. patent application Ser. No. 15/438,156, filed on Feb. 21, 2017, which is a continuation of International Patent Application No. PCT/EP2015/065352, filed on Jul. 6, 2015, which claims benefit of U.S. Patent Provisional Application 62/040,983, filed Aug. 22, 2014, and also claims priority to European Patent Application No. 14182509.1, filed Aug. 27, 2014, which claims benefit of U.S. Patent Provisional Application No. 62/040,983, filed on Aug. 22, 2014, each application being hereby incorporated herein by reference.

TECHNICAL FIELD

This application pertains to the near field communication (NFC) in contactless systems. In particular embodiments, this application is directed to a method for a phase calibration in a frontend circuit of an NFC tag device, to a frontend circuit and to an NFC tag device.

BACKGROUND

NFC tag devices are employed in Radio Frequency Identification (RFID) systems that allow communication between an NFC tag device and a corresponding NFC reader device using inductive coupling. During this communication the reader mainly sends commands to the tag. Subsequently, the tag answers by transmitting data, e.g., identification information to the reader. Usually, tag and reader devices operate according to industry standards. ISO/IEC 14443 is an example for such industry standard which is also underlying the present application.

ISO/IEC 14443 defines contactless chip cards with an integrated NFC tag device in proximity coupling applications. Readers operating according to the standard use signals with a frequency of 13.56 MHz, called carrier frequency, to transfer data to a tag device. The tag device, which is also called a transponder, transmits data to the reader using signals with a frequency which is an integer divider of the carrier frequency, e.g., 13.56 MHz/16 and is named the subcarrier frequency. According to ISO/IEC 14443, the transponder is powered by the field of the reader and applies a load modulation to the reader's signal when transmitting data.

The operating range of RFID systems is limited by a coupling factor between an antenna of the reader and an antenna of the tag. The coupling factor represents a measure for the strength of inductive coupling between reader and tag and basically is a function of distance and angle between reader and tag antennae, as well as, a function of mechanical characteristics or geometry of the antennae. In order to increase the operating range or to decrease the antenna size, concepts have been developed which provide chip cards with a power source, e.g., a battery which enables these chip cards to actively generate a load modulated signal with the subcarrier frequency, thereby emulating the standard ISO/IEC 14443 passive load modulation. This process is called active load modulation.

The actively generated signal is synchronized to the signal of the reader. The active modulation allows using miniature antennas while maintaining transaction distance equal to or longer than the legacy, i.e., passive contactless cards. Having the option to use a miniature antenna is advantageous in mobile phones or wearable devices where space is the most critical constraint. The cost of the antenna is also reduced. A long operating range is likewise important for a good user experience and hence for the adoption of the contactless technology by the mass market in applications such as mobile phones.

A tag or tag device that employs active load modulation is called an active tag. The signal generated by the reader is also called a reference signal, a carrier signal or a reader signal. The signal generated by the tag during active load modulation is also named active load modulation signal.

SUMMARY

In one embodiment, a method for a phase calibration in a frontend circuit of a near field communication (NFC) tag device is disclosed. A reference signal generated by an NFC signal generator device and a phase calibration command are received. An active load modulation signal is generated with a preconfigured value of a phase difference with respect to the reference signal of the NFC signal generator device. An amplitude of a test signal present at an antenna of the NFC tag device is measured. The test signal results from overlaying of the reference signal with the active load modulation signal. The following steps are repeated: modifying the value of the phase difference, providing the active load modulation signal with the modified value of the phase difference, measuring an amplitude of the test signal and comparing the measured amplitude with the previously measured amplitude or with a reference amplitude until the measured amplitude fulfills a predefined condition. The value of the phase difference corresponding to the previously measured amplitude is stored.

BRIEF DESCRIPTION OF THE DRAWINGS

The text below explains the proposed principle in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures.

FIG. 15 shows a seventh exemplary embodiment of the method for a phase calibration according to the proposed principle.

The following reference symbols can be used in conjunction with the drawings:

T, T' Tag device
R Reader device
L Antenna
MC Matching circuit
FE, FE' Front end circuit
H, H' Host component
S1, S2, . . . , S9 Step
S11, S21, S2a, S31, S41, S4a Step
S51, S61, S71, S81, S91, S10 Step
S8a, S51a, S8b, S82, S92, S00 Step
S01, S83, S83a, S93, S84 Step
Sr, St, Sf, Sc, Sd Signal
V1, V2, V3, Vm1, Vm2, Vm3, Vm4 Amplitude
Vmax, Vmin, Vref Amplitude
P1, P2, Px Phase difference
CLK Clock generator circuit
CTL Control unit
DRV Driver circuit
MES Measurement circuit
REC Receiver circuit
Cb Coupling capacitance
RFO1, RFO2 Signal output
ANT1, ANT2 Test signal input
t time
VSS reference potential terminal
C1, C2, C3, C4 condition.

DETAILED DESCRIPTION OF ILLUSTRATIVE EMBODIMENTS

Figure 1:
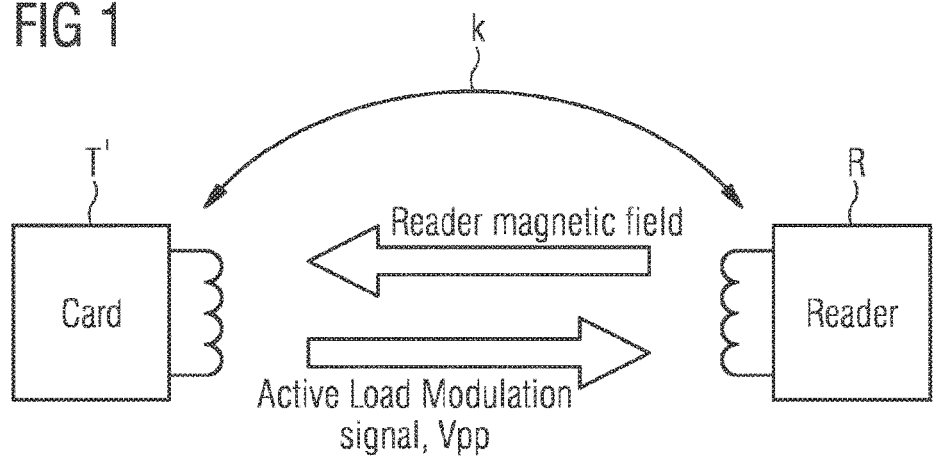
FIG. 1 shows an NFC system.

A known NFC system that also uses active load modulation is depicted in FIG. 1. The system has an NFC tag device T' and an NFC reader device R. The reader R emits a magnetic field by means of the carrier signal at the carrier frequency via its antenna. The tag T' responds with the active load modulation signal using the subcarrier frequency. In general, the communication between the tag device T' integrating the active load modulation and the reader device R is half duplex. The contactless reader R sends a command and the tag device T' in card emulation mode answers to this command. Several commands, each of them followed by a card response, form a transaction. Transactions are performed for payment, access control or transportation.

In legacy tag devices T' passive load modulation is achieved by switching a capacitive or a resistive load on its own antenna. In an active load modulation which is compatible with ISO 14443, the tag T' generates a 13.56 MHz signal synchronized to the reader magnetic field to modulate the data. On the reader side, this load modulation signal has exactly the same characteristics as the legacy passive load modulation signal. The strength of the load modulation is defined by the load modulation amplitude. The industry standards ISO 14443 or EMVCo define limits for the parameters as well as the setup required for the measurement. The benefit of the active load modulation is that the same load modulation amplitude can be produced with an antenna which is hundred times smaller than the antenna of a passive tag.

In an active load modulation system, for a given coupling coefficient k between the reader R antenna and the tag T' antenna, two parameters are critical in generating the correct load modulation amplitude: a peak to peak voltage Vpp generated at the tag T' antenna of a certain impedance and a phase difference between the active modulation signal and the reader signal.

For a given coupling factor k and a given active load modulation signal amplitude at the card antenna, the maximum load modulation amplitude seen at the reader antenna occurs when the phase difference between the active load modulation signal and the reader signal is either 0° or 180° when measured at the tag T' antenna. Any other phase difference value will result in a lower load modulation amplitude. This amplitude even is zero when the phase difference is either 900 or 2700. In that case, the data is phase modulated, which is not compliant with EMVCo Contactless standard. The relationship between the load modulation amplitude and the phase difference is a cosine function.

The biggest challenge for a tag T' employing active load modulation consists in the ability to emit an active load modulation signal having a constant and defined phase difference with respect to the reader signal. For a given coupling factor k between reader R and tag T' antennae, as well as for a given output power of the reader R and the active load modulation signals, the amplitude modulation depth seen by the reader's receiver depends exclusively on the phase difference generated by the tag T'. In order to achieve a desired phase difference, the tag T' having active load modulation can generate any delay or phase difference internally from 0° to 360° by use of a configuration register. This phase difference compensates also for internal delays experienced by the reader signal and the generated load modulation signal when travelling from the antenna across an external matching circuitry, internal signal processing circuitry and back to the antenna through the external matching circuitry.

A problem arises from the fact that the delay described above has to be configured specifically for each active tag device produced because of silicon process variations, as well as tolerances within the external matching circuitry components and antenna. These variations may create a +/−75° variation of the phase difference for a given phase setting value. To ensure correct operation, the phase difference variation should not exceed +/−30°. To fulfil these requirements, laborious tests are necessary. During these tests, available phase difference values have to be run through and the value that provides, for example, the maximum load modulation amplitude when measured at the reader side has to be selected. This testing and calibration takes several tens of seconds which is not acceptable for a production of high volume consumer devices.

Figure 2:
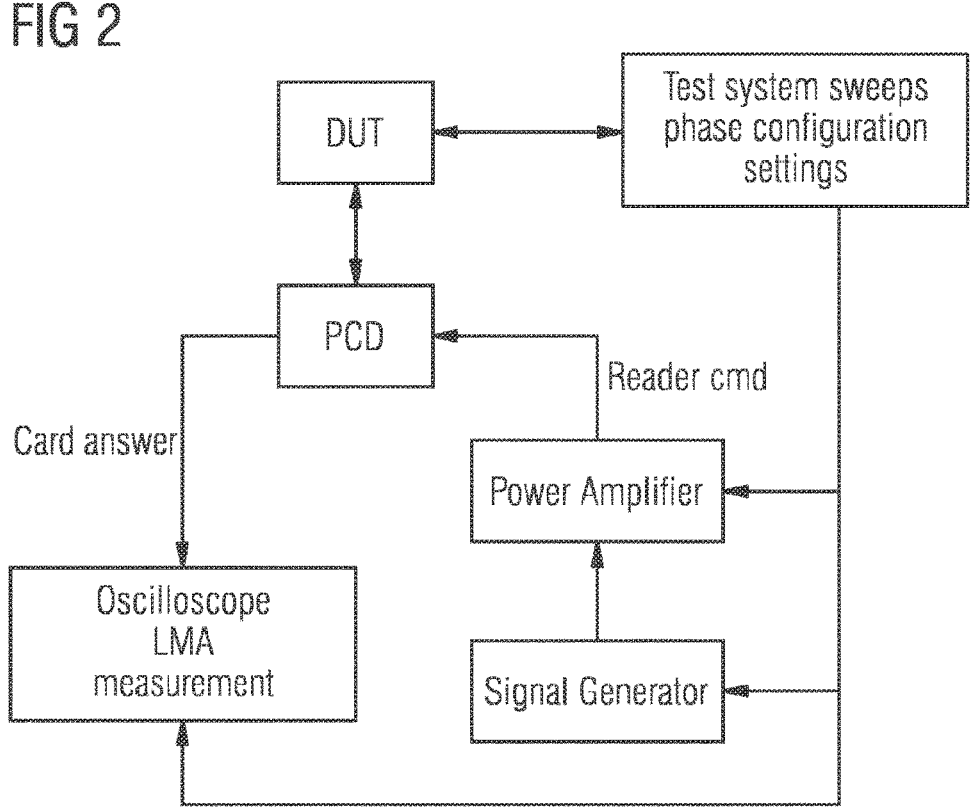
FIG. 2 shows a test setup for a phase calibration.

FIG. 2 shows the setup used for the above described test and phase calibration process. The existing solution to calibrate the phase on active tag devices is to use a phase calibration in the production sequence. During this calibration step, each assembled device goes through a phase calibration procedure to determine the phase setting that provides the best load modulation amplitude when measured on standard measurement benches like, for example, on a Europay MasterCard Visa, EMV, Contactless Proximity Coupling Device.

For the phase calibration the NFC tag device T, called the device under test (DUT) is placed near a proximity coupling device (PCD) which is an NFC device emulating a reader like a contactless point of sale terminal for instance. The reader signal is generated by a signal generator, amplified by a power amplifier and then fed to the PCD. The test system causes the DUT to use a first phase setting. The PCD then generates a reader command and the DUT generates a card answer by means of an active load modulation signal using this first phase setting. The amplitude of the resulting load modulation signal is measured at the PCD's antenna by means of an oscilloscope in a load modulation amplitude (LMA) measurement.

For this purpose, the PCD is connected to the oscilloscope. The DUT and measurement equipment are controlled by the test system. The value of the measured amplitude is stored. The test system causes the DUT to use the next phase setting for generating the load modulated signal and the resulting amplitude is again measured on the antenna of the reader device. The test system proceeds by repeating these steps and thereby sweeps through all phase configuration settings stored in the DUT. By this, the phase setting with the maximum LMA measured at the reader antenna is determined and configured in the DUT.

However, the described phase calibration process approximately takes several tens of seconds in the production which is too long for a high volume production.

Figure 3:
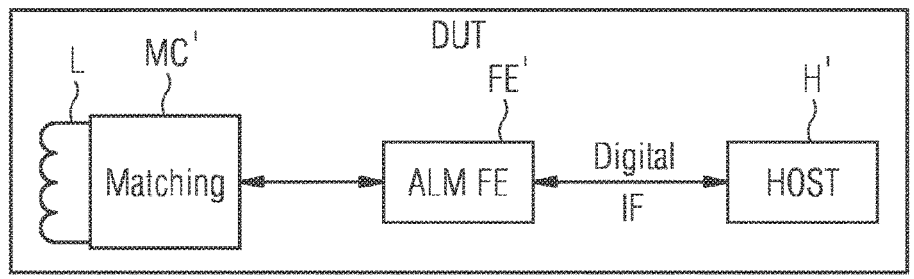
FIG. 3 shows components of a tag device.

FIG. 3 shows the main building blocks of the DUT. The DUT has an antenna L, a matching circuit MC', a frontend circuit, FE' and a host component H'. The antenna L is coupled via the matching circuit MC' to the frontend circuit FE'. The host component H' is coupled by a digital interface to the frontend circuit FE'. The host component H' controls the frontend circuit FE'. It interprets the commands received from a reader device and provides the data which is to be returned to the reader in answering the commands. The frontend circuit FE' realizes the high frequency functionality necessary in generating and receiving signals by means of the antenna L and the matching circuit MC'.

The present application starts out from a test setup as described in FIG. 2. Although the currently used equipment is based on an automation of sweeping through the phase settings in a tag device, the test times that can be achieved are too long. According to embodiments of the invention, a method for a phase calibration, a corresponding frontend circuit and an NFC tag device can achieve shorter test times.

The definitions as described above also apply to the description of the below embodiments unless stated otherwise.

In one embodiment, a method for a phase calibration in a frontend circuit of a near field communication (NFC) tag device is disclosed. A reference signal generated by an NFC signal generator device and a phase calibration command are received. An active load modulation signal is generated with a preconfigured value of a phase difference with respect to the reference signal of the NFC signal generator device. An amplitude of a test signal present at an antenna of the NFC tag device is measured. The test signal results from overlaying of the reference signal with the active load modulation signal. The following steps are repeated: modifying the value of the phase difference, providing the active load modulation signal with the modified value of the phase difference, measuring an amplitude of the test signal and comparing the measured amplitude with the previously measured amplitude or with a reference amplitude until the measured amplitude fulfills a predefined condition. The value of the phase difference corresponding to the previously measured amplitude is stored.

All the steps of the proposed method are completed within the frontend circuit of the NFC tag device. After receiving the phase calibration command, the frontend circuit itself goes through the different values or settings of the phase difference and measures the amplitude of the resulting signal at its own antenna until the amplitude which matches the predefined condition is detected. The frontend circuit is configured to the value of the phase difference which corresponds to the amplitude. Thereby, the phase of the active load modulation signal is configured with respect to the phase of the reference signal of the NFC signal generator device.

As the method is processed within the frontend circuit, the time which previously had to be spent on sending commands for activating a different setting, sending reader commands, reading the card answer, measuring the amplitude on the reader device and generating new commands for a different setting is saved. The process can be completed in approximately one millisecond.

According to embodiments of the invention, due to the auto-calibration of the phase of the active load modulation signal, the duration of the calibration process is reduced.

The test signal generator device can be an NFC reader device, or a test device like the standard EMVCo tester which generates the reference signal which represents the carrier signal having the defined carrier frequency as of ISO 14443, for example.

The phase difference is a value indicated in degrees which defines the difference in phase between two signals, here between the reference signal and the active load modulation signal. The frontend circuit implements various phase difference values which differ from each other. The proposed method performs measurements of the amplitude at the tag device antenna using different values for the phase difference until the measured amplitude fulfills the predefined condition.

In an alternative embodiment the step receiving a phase calibration command is performed prior to the step receiving a reference signal.

In a development the predefined condition comprises at least one of
the measured amplitude is smaller than the previously measured amplitude,
the measured amplitude is bigger than the previously measured amplitude,
the measured amplitude is smaller than the reference amplitude, or
the measured amplitude is bigger than the reference amplitude.

In the first case, in which the method is performed as long as the measured amplitude is smaller than the previously measured amplitude, a maximum of the amplitude of the test signal and the corresponding value of the phase difference are detected.

In the second case, in which the method is performed as long as the measured amplitude is bigger than the previously measured amplitude, a minimum of the amplitude of the test signal and the corresponding value of the phase difference are detected.

In the third case, in which the method is performed until the measured amplitude is smaller than the reference amplitude, the amplitude of the test signal and the corresponding value of the phase difference are determined which match the reference amplitude when approaching the reference amplitude from a higher amplitude value.

In the fourth case, in which the method is performed until the measured amplitude is bigger than the reference amplitude, the amplitude of the test signal and the corresponding value of the phase difference are determined which match the reference amplitude when approaching the reference amplitude from a lower amplitude value.

In a development the method further comprises: measuring an amplitude of the test signal during non-emission of the active load modulation signal, and recording this amplitude as the reference amplitude.

In order to determine the reference amplitude, the amplitude of the test signal is measured at a point in time at which the active load modulation signal is not being provided. The measured amplitude then represents the amplitude of the reference signal, because the reference signal is provided continuously during the phase calibration. An exemplary point in time for determining the reference amplitude is right after the receiving the phase calibration command step.

According to one embodiment, the active load modulation signal is generated in function of an internal carrier signal and a data signal.

According to a first possibility, the active load modulation signal is generated as a burst in function of the internal carrier signal and the data signal during a short period of time. According to another possibility the active load modulation signal is a function of an active load modulation of the internal carrier signal with the data signal.

Consequently, the active load modulation signal is emitted with a frequency synchronized to the frequency of the reference signal and with a configured phase difference to the reference signal during a short period of time. This period preferably is long enough to perform the measurement of the amplitude of the resulting test signal.

In case of the ISO 14443 standard, the data signal comprises the data to be transmitted which are coded as defined in the standard and modulated with a signal having the subcarrier frequency. Embodiment methods of the present disclosure do not require any specific data or data pattern. Instead, the signal having the subcarrier frequency is used for the modulation with the internal carrier signal to generate the active load modulation signal.

In the case of other standards, for example, Felica or ISO 15693, the data signal comprises the data to be transmitted which are coded in a specified manner. However, the standards do not employ the modulation using the subcarrier frequency.

In case of the active load modulation signal being generated in the form of a burst, the data signal supplied by the control unit comprises the burst which means at least information regarding a start and a stop point in time. Consequently, the active load modulation signal is provided for a period of time defined by the start and stop point in time.

The tag device, which implements embodiment methods of the present disclosure, uses active load modulation as described above. It may also implement state of the art passive load modulation.

In a development the modifying of the value of the phase difference realizes an increase or a decrease of the phase difference of the active load modulation signal with respect to the reference signal.

In order to find the amplitude of the test signal occurring at an antenna of the tag device the amplitude matching the predefined condition, and starting out from the preconfigured value of the phase difference, the phase difference can either be increased or decreased when switching to the next value of the phase difference and measuring again the amplitude of the test signal. The preconfigured value can also be called the default value.

In a further development the values of the phase difference are retrieved from a memory in the frontend circuit or in the host component of the NFC tag device.

Various values of the phase difference which configure the phase of the active load modulation signal to a fixed phase difference with respect to the reference signal are stored within the frontend circuit. These values are used one after the other until the amplitude maximum, the amplitude minimum or the amplitude matching the reference amplitude have been detected. The memory can be volatile or non-volatile.

In one embodiment the phase calibration command is generated by a host component of the NFC tag device.

The command which triggers the auto phase calibration according to embodiment methods of the present disclosure is generated and emitted by the host component of the tag device as soon as the host component detects the reference signal emitted by the signal generator device.

In another embodiment the test signal comprises voltage values which are proportional to a voltage at the antenna of the NFC tag device.

Consequently, the amplitude of the test signal is determined by measuring the voltage level at the antenna of the NFC tag device.

In a development the internal carrier signal is generated using the reference signal. A frequency of the internal carrier signal is adapted to a frequency of the reference signal.

A frequency of the reference signal is called carrier frequency and amounts to, for instance, 13.56 MHz, when using the ISO 14443 standard. The subcarrier frequency in this case is determined by dividing the carrier frequency by 16 and amounts to 848 KHz.

In a development a period during which the active load modulation signal is not emitted is present between two consecutive amplitude measurements of the test signal.

During this period the internal carrier signal is resynchronized to the reference signal. This can be achieved by means of a phase-locked loop, for instance.

In one embodiment a frontend circuit for a near field communication, NFC, tag comprises a test signal input for receiving a test signal which is proportional to a signal occurring at an antenna which can be connected to the frontend circuit and a signal output for providing an active load modulation signal. The test signal input is further prepared for receiving a reference signal generated by an NFC signal generator device. The frontend circuit further has a control unit, a receiver circuit, a measurement circuit, a clock generator circuit and a driver circuit. The control unit is prepared to run and control embodiment methods of the present disclosure as described above and to provide a value of a phase difference and a data signal.

The receiver circuit is coupled to the test signal input and is prepared to perform envelope detection on the reference signal and on the test signal. The measurement circuit is coupled to the receiver circuit and to the control unit. The measurement circuit is configured to provide an amplitude of the test signal. The clock generator circuit is coupled to the receiver circuit and to the control unit and is adapted to generate an internal carrier signal using the value of the phase difference. The driver circuit is coupled to the clock generator circuit and to the signal output. The driver circuit is configured to provide the active load modulation signal as a function of the internal carrier signal with the data signal.

As soon as the reference signal is detected by the test signal input and the receiver circuit, the control unit initiates the generation of the active load modulation signal with the help of the clock generator circuit and the driver circuit. The active load modulation signal is provided at the signal output and emitted by means of the connectable antenna. An overlay of the active load modulation signal with the reference signal occurs at the antenna and is tapped as test signal at the test signal input. The measurement circuit provides the amplitude of the test signal. The control unit subsequently configures the phase difference by choosing the next value of the phase difference and provides it to the clock generator circuit. Consequently, the active load modulation signal is provided using the next value of the phase difference and the amplitude of the test signal is measured once again. As described above, the process is repeated until the amplitude of a test signal which complies with the predefined condition is found. The corresponding value of the phase difference is used as a calibrated value for the frontend circuit in operation. Alternatively, a value derived from the value may be used in operation.

As the phase calibration takes place completely within the frontend circuit, the calibrated value of the phase difference for the NFC tag device in production can be read out shortly after starting the method, e.g. in one millisecond, which greatly reduces the time for calibration and testing.

In a development the measurement circuit comprises an analog-to-digital converter circuit.

The analog-to-digital converter determines the amplitude of the test signal based on the envelope provided by the receiver circuit.

In one embodiment an NFC tag device has a frontend circuit as described above, an antenna, a host component which is coupled to the frontend circuit by means of a digital interface and a matching circuit which is connected between the frontend circuit and the antenna.

The value of the phase difference which produces the amplitude of the test signal that fulfills the predefined condition is stored either in the frontend circuit or in the host component in a non-volatile form.

In a development the matching circuit of the tag device comprises a series capacitor which is coupled between the antenna and the test signal input of the frontend circuit.

The series capacitor may even be directly coupled between the antenna and the test signal input. The antenna is formed by at least one coil.

The series capacitor allows dividing a voltage at the antenna by a fixed value depending on the capacitance value.

In another development the series capacitor forms a capacitive divider with a capacitance of the test signal input.

As a consequence of the series capacitor, an amplitude of the test signal is proportional to the voltage at the antenna of the tag device.

Figure 4:
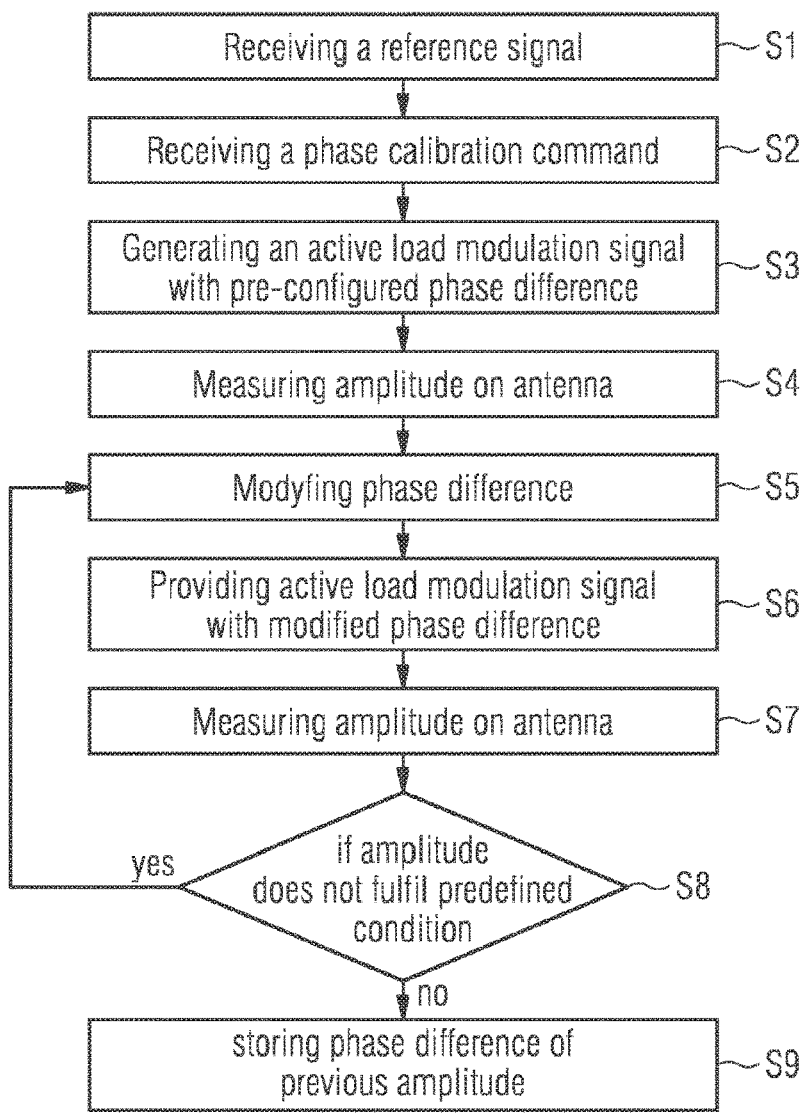
FIG. 4 shows a first exemplary embodiment of a method for a phase calibration according to the proposed principle.

FIG. 4 shows a first exemplary embodiment of a method for a phase calibration according to the proposed principle.

In step S1, a frontend circuit receives a reference signal which is generated by an NFC test signal generator device.

In step S2, the frontend circuit receives a phase calibration command. Therein, the phase calibration command is provided e.g. by a host component of an NFC tag device whose frontend circuit is being phase calibrated.

In step S3, the frontend circuit generates an active load modulation signal with a preconfigured phase difference with respect to the received reference signal. Different values of the phase differences used one after the other in the described method are stored beforehand in a memory, e.g. registers in the frontend circuit. It is also defined beforehand which of the stored values is used in the first place as the preconfigured or default value of the phase difference.

In step S4, an amplitude of a test signal present at an antenna which is connectable to the frontend circuit is measured. The amplitude may be determined as a voltage value.

In step S5, the value of the phase difference is modified. This means that the next value of the phase difference is retrieved from the storage, e.g. register. This leads to an increase or a decrease of the actual phase difference between the reference signal and the active load modulation signal.

In step S6, the frontend circuit provides the active load modulation signal with this modified phase difference value.

During step S7, another measurement of the amplitude of the test signal is conducted.

In step S8, this measured amplitude is compared to the previously measured amplitude or to a reference amplitude. As long as the newly measured amplitude does not fulfil the predefined condition, steps S5, S6, S7, and S8 are repeated.

Otherwise, i.e. if the newly measured amplitude fulfills the predefined condition, the desired amplitude has been found in the previous measurement. Consequently, the previous value of the phase difference, which corresponds to the previously measured amplitude, represents the value of the phase difference to which the frontend circuit is to be calibrated.

Therefore, in step S9, the phase difference corresponding to the previous amplitude, which has been named previous value of the phase difference, is stored. The phase difference value can either be stored directly in the frontend circuit or can be stored in a host component of the NFC tag device under test after reading out the value of the phase difference by the host component.

Optionally, a value of the phase difference derived from the value determined by means of the method may be stored.

Due to the described embedded auto-phase calibration in the frontend circuit, the desired phase setting which realizes a defined phase difference between the active load modulation signal and the reference signal can be determined in approximately less than 1 ms after reception of the reference signal. This represents a significant reduction in time for a calibration of frontend circuits.

Figure 5:
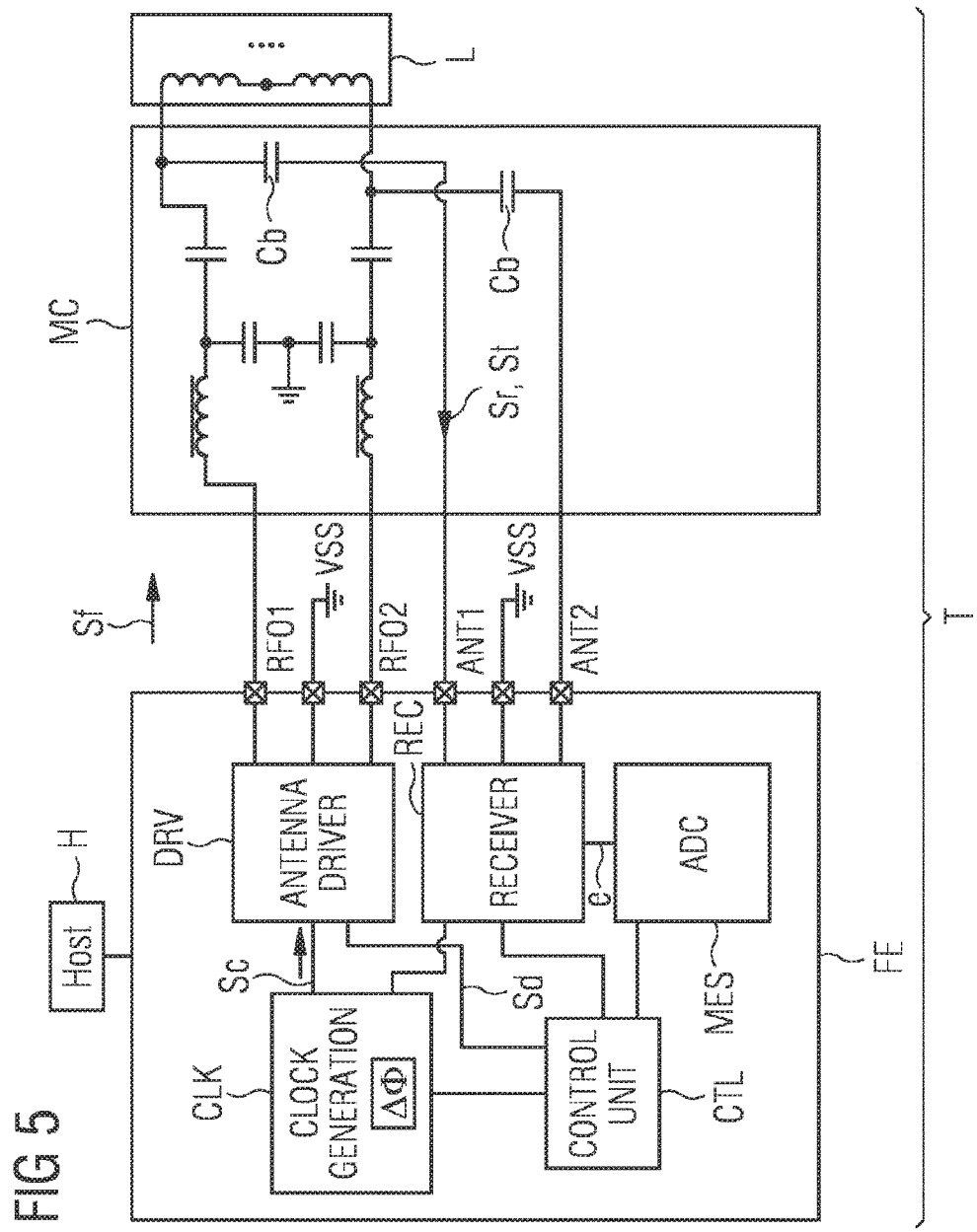
FIG. 5 shows an embodiment example of an NFC tag device with a frontend circuit according to the proposed principle.

FIG. 5 shows an embodiment example of an NFC tag device with a frontend circuit according to the proposed principle. The tag device T comprises the frontend circuit FE, a matching circuit MC, a host component H, and an antenna L. The antenna L is connected via the matching circuit MC to respective inputs and outputs of the frontend circuit FE. The antenna L is prepared to emit and receive NFC signals as required in the respective standards and as known to a person skilled in the art. The host component H is coupled to the frontend circuit FE by means of a suitable interface, for example, by a digital interface.

The frontend circuit FE uses a power supply of the host component H. Alternatively, the frontend circuit FE may be powered by a superordinate device which integrates the tag T. This superordinate device may be a mobile phone, for instance.

The matching circuit MC has different inductors, capacitances and resistors to connect pins of the antenna L to the frontend circuit FE as is well known to someone skilled in the art. Furthermore, each antenna pin is coupled via a series capacitance Cb to a test input ANT1, ANT2 of the frontend circuit FE. Each series capacitance Cb is configured to form a capacitive divider with a capacitance of the test input ANT1, ANT2 in order to deliver a test signal St or a reference signal Sr to the test inputs ANT1, ANT2, which is reflecting the voltage at the antenna L.

The frontend circuit FE comprises a signal output RFO1, RFO2 for providing an active load modulation signal Sf and the test signal input ANT1, ANT2 for receiving the reference signal Sr and the test signal St. As differential signals are used in this exemplary embodiment, inputs and outputs of the frontend circuit FE are prepared correspondingly. In an alternative implementation, single-ended signals may be employed.

Furthermore, frontend circuit FE comprises a control unit CTL which is prepared to run and control the method described above. The control unit CTL provides several values of the phase differences P1, P2, PX and a data signal Sd. Moreover, the frontend circuit FE comprises a receiver circuit REC, a measurement circuit MES, a clock generation circuit CLK and a driver circuit DRV. The receiver circuit REC is coupled to the test signal input ANT1, ANT2 and is prepared to perform an envelope detection of the reference signal Sr or the test signal St. The receiver circuit REC is furthermore coupled to the control unit CTL and to a reference potential terminal VSS. The measurement circuit MES is coupled to the receiver circuit REC and to the control unit CTL. The measurement circuit MES is configured to provide an amplitude as will be described in more detail with reference to FIG. 8 of the test signal St. The clock generator circuit CLK is coupled to the receiver circuit REC and to the control unit CTL. The clock generator circuit CLK is adapted to generate an internal carrier signal Sc using the phase difference P1, P2, PX. The driver circuit DRV is coupled to the clock generator circuit CLK and to the signal output RFO1, RFO2. The driver circuit DRV is furthermore connected to the reference potential terminal VSS. The driver circuit DRV is configured to modulate the internal carrier signal Sc with the data signal Sd in order to provide the active load modulation signal Sf which is emitted by the antenna L.

The depicted tag T can be used in the state-of-the-art test setup as described in FIG. 2.

The measurement circuit MES comprises amongst others an analog-to-digital converter circuit which completes determination of a respective amplitude of the test signal St when the method is executed. For this, an envelope e of the test signal St is detected by the receiver circuit REC and its amplitude is measured by the analog-to-digital converter.

The reference signal Sr is received at the test signal inputs ANT1, ANT2. The clock generator circuit CLK generates the internal carrier signal Sc using a clock extracted from the reference signal Sr by the receiver circuit REC. Consequently, a frequency of the internal carrier signal Sc is adapted to a frequency of the reference signal Sr. The driver circuit DRV modulates the internal carrier signal Sc with the data signal Sd, thereby providing the active load modulation signal Sf. Alternatively, the driver circuit DRV provides the active load modulation signal Sf as a burst in function of the internal carrier signal Sc and the data signal Sd during a short period of time. Consequently, the active load modulation signal Sf is synchronized in frequency to the reference signal Sr and emitted at the signal outputs RFO1, RFO2. In order to keep the same order of amplitude for both signals at the antenna L, a supply voltage of the driver circuit DRV can be configured to its lower value or the driver circuit's DRV resistance is increased. The phase difference between the signals observed at the antenna L is configured to the different values P1, P2, PX which are retrieved from internal registers, for example. The depth and polarity of the amplitude modulation observed in the overlaid signal at the antenna L, i.e. the test signal St, depends on the phase of the active load modulation signal Sf as described above.

In order to determine the reference amplitude, an amplitude of the reference signal Sr is measured by the measurement circuit MES at the test signal input ANT1, ANT2 during a period when the active load modulation signal Sf is not emitted.

The short period of time during which the active load modulation signal Sf is provided as a burst amounts to, for example, several periods to several tens periods of the internal carrier signal Sc.

In an alternative implementation, embodiment methods of the present disclosure may be executed by the host component H of the tag device T. The host component H can be realized as an NFC controller or a secure element as known in the art.

Figure 6:
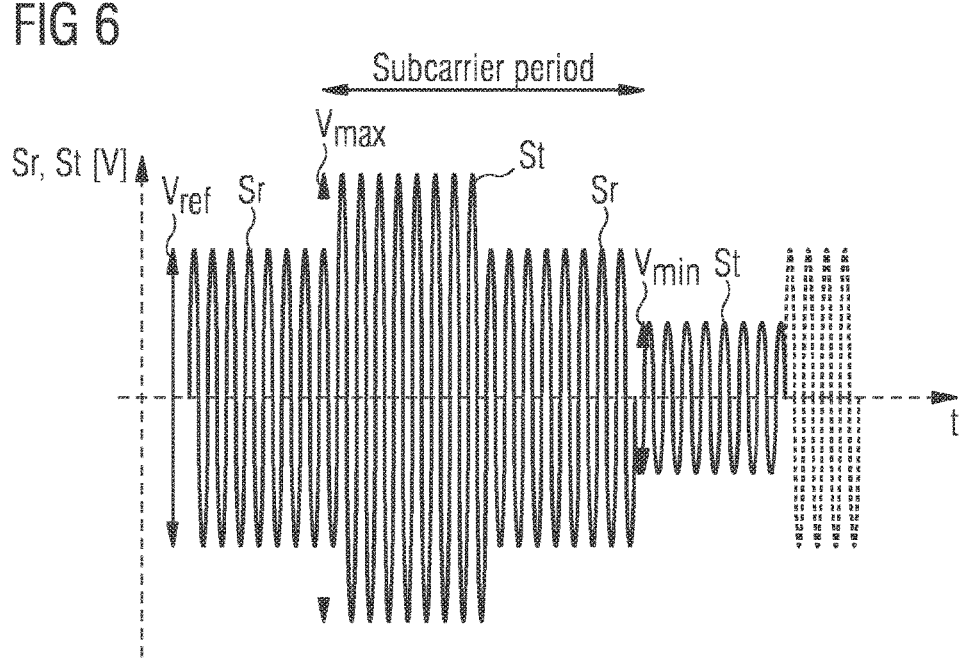
FIG. 6 shows a diagram with signals occurring at the antenna of the NFC tag of FIG. 5.

FIG. 6 shows a diagram with signals occurring at the antenna of the NFC tag of FIG. 5. The abscissa represents time t, the ordinate shows voltage values of reference signal Sr and test signal St. Amplitude values V1, V2, and V3 are depicted which each represent a peak-to-peak voltage or a peak voltage of the envelope of the signal detected at the test input of the frontend circuit as of FIG. 5.

The frontend circuit provides the active load modulation signal Sf according to the standard used. This results in periods with only the reference signal Sr being present at the test input alternating with periods during which the test signal St reflects the overlay of the active load modulation signal Sf with the reference signal Sr.

In the exemplary case of the standard ISO 14443 which employs a subcarrier, the frontend circuit provides the active load modulation signal Sf for instance during half of a period of the subcarrier. For instance, the active load modulation signal is turned on during the first half of this period and turned off during the second half of this period. Consequently, in an exemplary implementation, the measuring of an amplitude of the test signal St is performed during one half of a subcarrier period during which the active load modulation signal Sf is provided. In other words, in the exemplary case of ISO 14443, since the subcarrier is 847 kHz, the active load modulation signal Sf is emitted during one half of the subcarrier frequency period which corresponds to eight periods of the carrier frequency. There is no emission during the other half during which the receiver circuit is resynchronized to the reference signal Sr.

Vref is the amplitude of the test signal St which occurs during the period in which the active load modulation signal is not emitted. It corresponds to the amplitude of the reference signal Sr which is sent out by the test signal generator device. Following the above description, amplitude Vref represents the reference amplitude.

Vmax is the amplitude of the test signal St during the period when active load modulation is performed and the active load modulation signal is switched on and provided at the signal output of the frontend circuit. The amplitude Vmax therefore is the amplitude resulting from overlaying the reference signal Sr with the active load modulation signal Sf which results in the test signal St. The overlaying of signals can also be designated a superimposition. In the depicted case, the amplitude Vmax represents the maximum amplitude of the test signal St which corresponds to a phase difference between the overlaid signals of 0°. A difference between the maximum amplitude Vmax and the reference amplitude Vref is positive and maximum. Amplitude Vmax as the maximum amplitude fulfills one predefined condition of embodiment methods of the present disclosure.

A minimum amplitude Vmin results from an overlay of the reference signal Sr with the active load modulation signal Sf using another phase difference which in this example amounts to 180°. A difference between the minimum amplitude Vmin and the reference amplitude Vref is negative with an absolute value also representing a maximum. Amplitude Vmin represents the minimum amplitude of the test signal St and also fulfills one predefined condition of embodiment methods of the present disclosure.

When the phase difference is between 0° and 90° or between 270° and 360°, the amplitude of the test signal St lies between Vref and Vmax. When the phase difference amounts to exactly 90° or exactly 270°, the amplitude of the resulting test signal St is equal to the reference amplitude Vref. When the phase difference lies between 90° and 270°, the amplitude of the resulting test signal St lies between Vmin and Vref.

Figure 7:
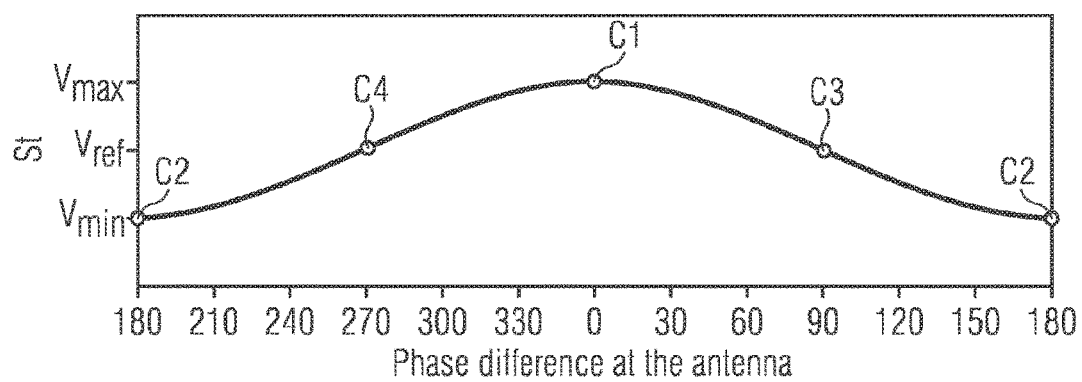
FIG. 7 shows a diagram of the amplitude of the test signal as a function of a phase difference between reference signal and active load modulation signal.

FIG. 7 shows a diagram of the amplitude of the test signal as a function of a phase difference between the reference signal and the active load modulation signal occurring at the antenna of the proposed NFC tag device. The abscissa depicts values for the phase difference in degrees, whereas the ordinate represents amplitudes of the test signal St during emission of the active load modulation signal.

As described above, a phase difference of zero degrees between the emitted active load modulation signal and the reference signal results in a maximum amplitude Vmax of the test signal St. This represents a first predefined condition C1 according to embodiment methods of the present disclosure.

A phase difference of 180° between the active load modulation signal and the reference signal leads to a minimum amplitude Vmin of the test signal St. This represents a second predefined condition C2 according to embodiment methods of the present disclosure.

A phase difference of 90° results in the test signal St taking on a reference amplitude Vref which corresponds to the amplitude of the reference signal. This represents a third predefined condition C3 of the measured amplitude of the test signal St according to a method of the present disclosure.

A phase difference of 270° also results in the test signal St having the reference amplitude Vref. This represents a fourth predefined condition C4 of the measured amplitude according to embodiment methods of the present disclosure.

It can be seen from FIG. 7 that the relationship between the phase difference at the antenna and the amplitude of the test signal St is a cosine function. Embodiment methods of the present disclosure enable determining which of the stored values of phase difference which is used for generating the active load modulation signal leads to which real phase difference occurring at the antenna of the tag device by detecting one of the four predefined conditions C1, C2, C3 or C4. Based on these findings, the frontend circuit can be calibrated to the desired value of the phase difference which is to be used in generation of the active load modulation signal.

Figure 8:
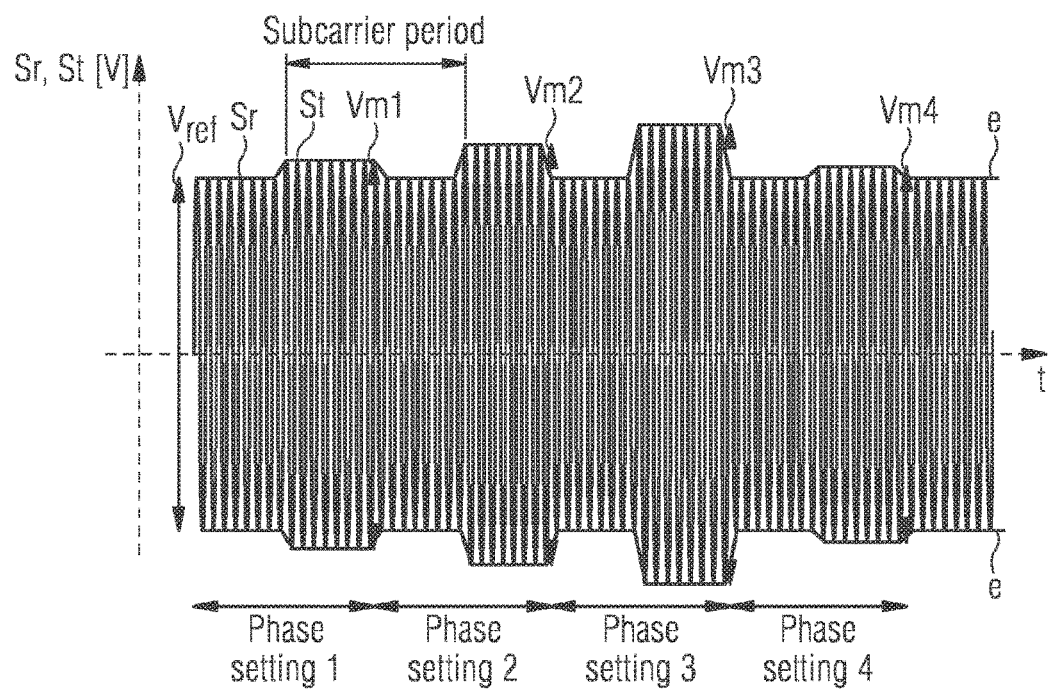
FIG. 8 shows a diagram with the test signal at a test input of the proposed frontend circuit during the proposed method.

FIG. 8 shows a diagram of the test signal occurring at the test input of the proposed frontend circuit during the proposed method. Like in FIG. 6, voltage values of reference signal Sr and test signal St are shown with reference to time t. The amplitude of the reference signal Sr is designated Vref. The amplitudes of the test signal St measured at the test signal input of the frontend circuit each time using a different value of the phase difference are designated Vm1, Vm2, Vm3, and Vm4. In each case, an envelope e of the test signal St is detected.

It is predefined in this case that the method determines the phase setting of the maximum amplitude of the test signal St.

As can be seen, the first value of the phase difference used in embodiment methods of the present disclosure as the preconfigured value of the phase difference results in amplitude Vm1 of the test signal St present during the first half of the subcarrier period. The frontend circuit switches to the next value of the phase difference in phase setting 2 and again determines the amplitude of the test signal St resulting therefrom, which amounts to Vm2. Comparison of Vm2 to Vm1 reveals that the actual value of the amplitude Vm2 is bigger than the previously measured value Vm1.

Consequently, the frontend circuit switches to the next value of the phase difference in phase setting 3, provides the active load modulation signal using this phase difference and measures the amplitude of the resulting test signal St which amounts to Vm3. Amplitude Vm3 is compared to the previously measured amplitude Vm2. Because Vm3 is bigger than Vm2, the frontend circuit switches to the next value of the phase difference and repeats the provisioning of the active load modulation signal and the measurement of the test signal St. The resulting amplitude Vm4 this time is determined to be smaller than the previously measured amplitude Vm3. Consequently, amplitude Vm3 is determined to be the maximum amplitude of the test signal St. It fulfills the predefined condition. The method returns the corresponding value of the phase difference, i.e., phase setting 3.

By this, the possible values of the phase difference which have been stored beforehand, e.g., in configuration registers, are tested in turn at each subcarrier period. At each period, the resulting amplitude VmX is measured. The phase difference which provides the largest VmX amplitude is stored as the optimized value.

As during each subcarrier period, one phase difference value can be tested, the maximum length of the calibration process is the duration of the subcarrier period multiplied by the number of stored values of phase differences. The duration of the subcarrier period amounts to approximately 1.2 microseconds. Consequently, time that has to be spent on calibration during production is greatly reduced when compared to the state of the art.

Figure 9:
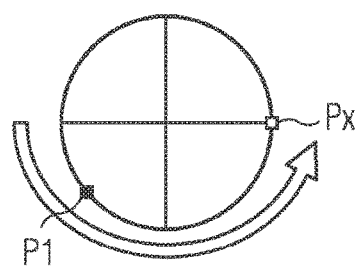
FIG. 9 shows an angle diagram of values of phase differences used in FIG. 4.

FIG. 9 depicts an angle diagram of values of the phase difference used in the method of FIG. 4. The initial value of the phase difference used in the method as preconfigured phase difference is P1. The phase difference amounts to approximately 210°. The method continues using different values of the phase difference and measuring the amplitudes as described and thereby moves in the direction of the arrow. Finally, phase difference value Px is determined, which corresponds to the maximum amplitude measured at the test signal input of the frontend circuit. Px represents a phase difference of zero degrees.

Figure 10:
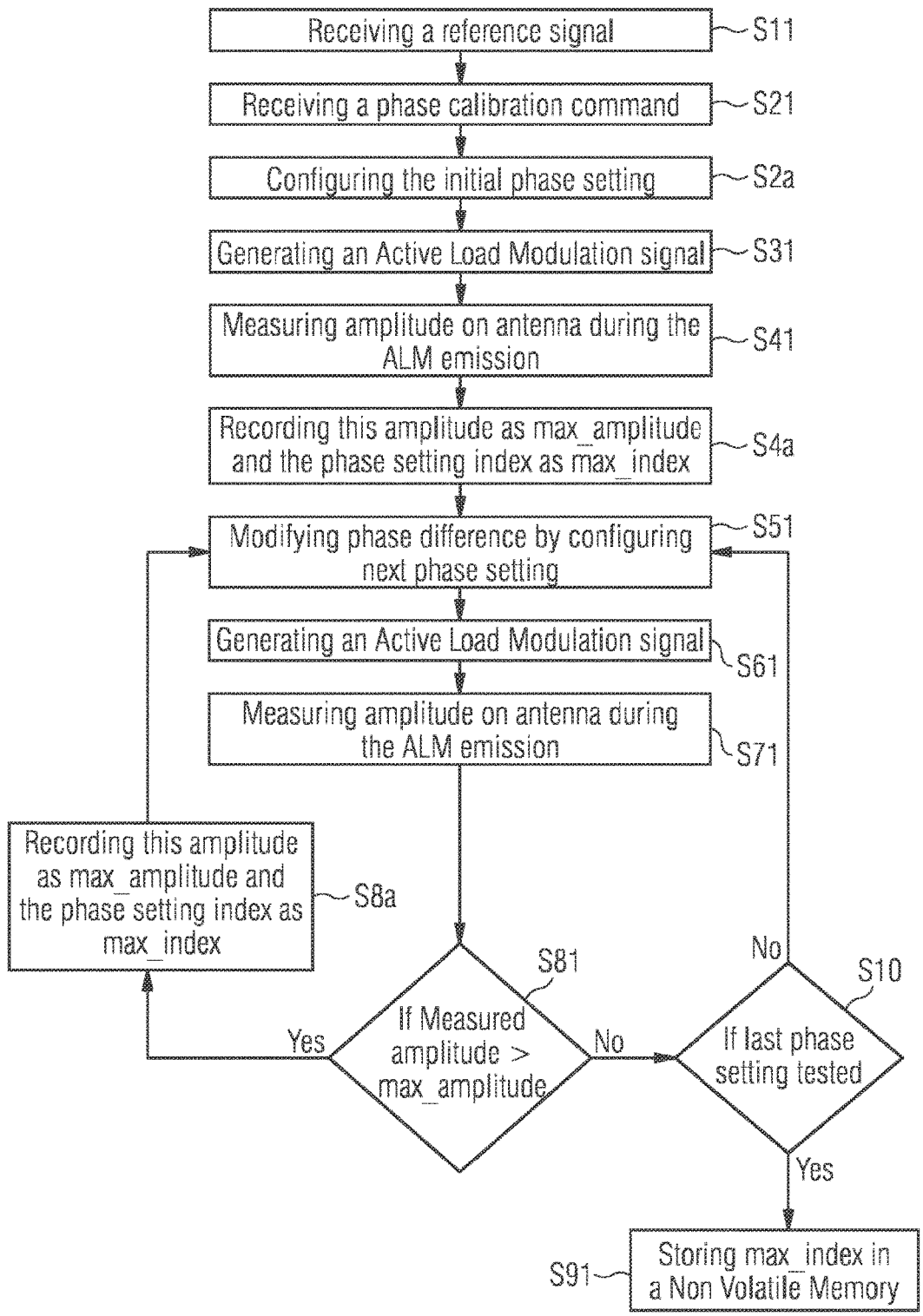
FIG. 10 shows a second exemplary embodiment of the method for a phase calibration according to the proposed principle.

FIG. 10 shows a second exemplary embodiment method of the present disclosure. In this embodiment the method as described for example in FIG. 4 is configured to detect the amplitude of the test signal that satisfies the first condition C1 as described in FIG. 7. That means that the maximum amplitude of the test signal is searched for.

In step S11, the frontend circuit receives the reference signal generated by the NFC test signal generator device.

In step S21, the frontend circuit receives the phase calibration command provided by the host component of the NFC tag device whose frontend circuit is being phase calibrated.

In step S2a, an initial phase setting is configured by choosing an initial value for the phase difference for the active load modulation signal from the memory.

In step S31, the frontend circuit generates the active load modulation signal using the initial phase difference value. The initially used value is the default value.

In step S41, an amplitude of the test signal occurring during emission of the active load modulation signal is measured.

This amplitude is recorded as max_amplitude in step S4a. Concurrently an index of the used phase setting is recorded as max_index.

In the following, the term index refers to a pointer which identifies a phase setting corresponding to a value of the phase difference.

In step S51, the value of the phase difference is configured to the next value with respect to the storage place in the memory. This leads to an increase of the phase difference.

In step S61, the active load modulation signal is generated using the next phase setting.

In step S71, another measurement of the amplitude of the test signal is conducted.

In step S81, this newly measured amplitude is compared to the max_amplitude. If the measured amplitude is bigger than the max_amplitude, the measured amplitude is recorded as max_amplitude and the index of the corresponding phase setting is recorded as max_index in step S8a. Subsequently, the steps S51, S61, S71 and S81 are repeated.

As soon as it is determined in step S81 that the measured amplitude is smaller than the max_amplitude, the described loop function is terminated.

In step S10 it is checked whether all possible phase difference values which are stored in the tag device have been tested. The loop is re-entered at the step S51 if not all of the possible values for the phase difference have been tested. As soon as all the phase settings have been tested, step S91 is performed.

The max_index is stored in a non-volatile memory in step S91. Therein, the max_index indicates the value of the phase difference out of the list of pre-stored values of phase differences to be used in generating the active load modulation signal which leads to a maximum amplitude of a test signal and consequently realizes an actual phase difference of about 0° with respect to the reference signal.

Thereby, the max_index can be stored in non-volatile memory of the control unit of the frontend circuit, or the host component of the tag device reads the max_index by means of the digital interface and stores it in its own non-volatile memory.

Figure 11:
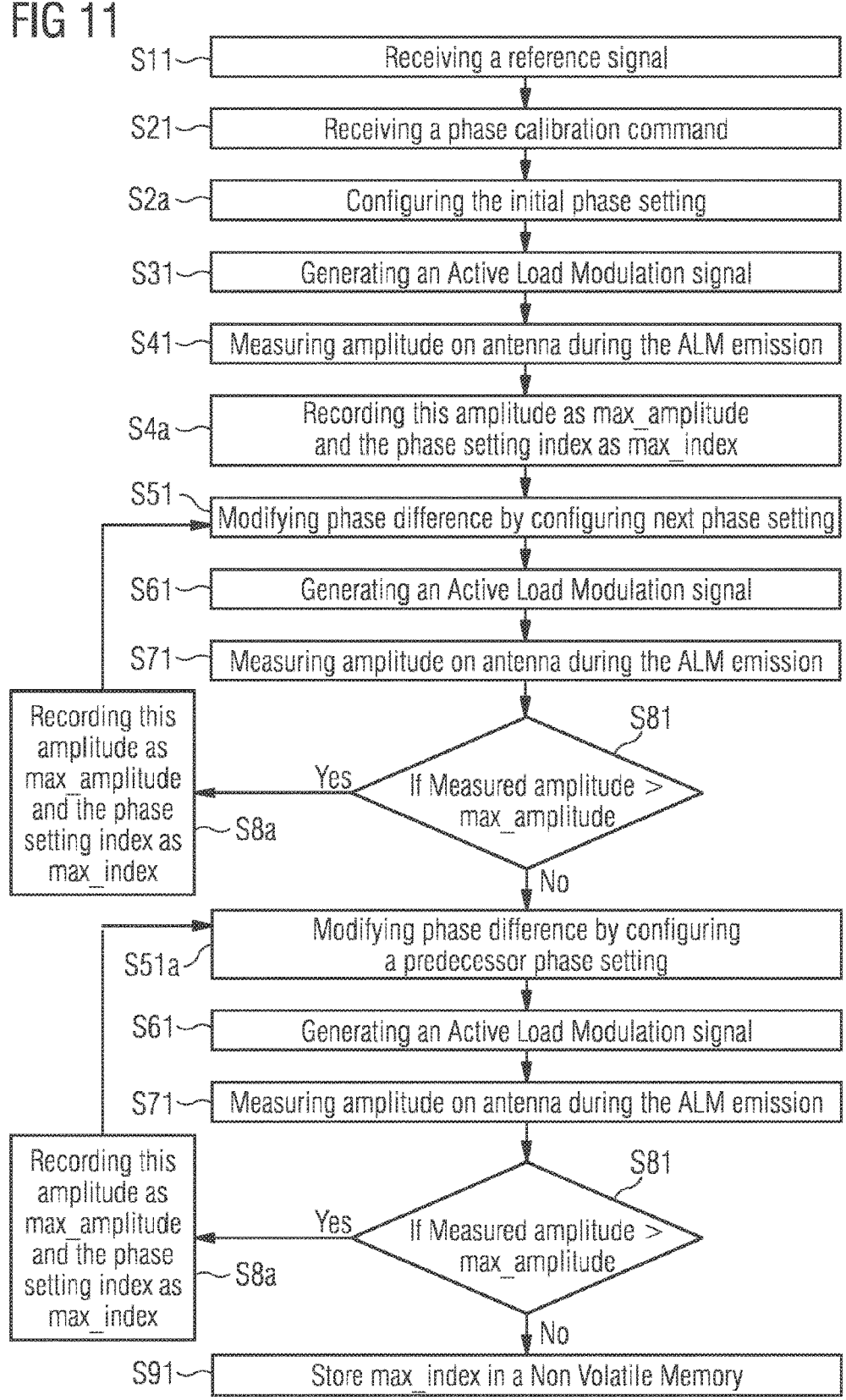
FIG. 11 shows a third exemplary embodiment of the method for a phase calibration according to the proposed principle.

FIG. 11 shows a third embodiment of a method of the present disclosure. In this embodiment, the method is also configured to find the maximum amplitude of the test signal defined as first condition C1 in FIG. 7. This means it is detected which value of the phase difference or which phase setting has to be configured in generation of the active load modulation signal that achieves a phase difference of zero degrees in relation to the reference signal emitted by a signal generator device or a reader device.

The method of FIG. 11 matches the embodiment described in FIG. 10 regarding steps S11, S21, S2a, S31, S41, S4a, S51, S61, S71, S81, S8a and S91.

The difference to the embodiment of FIG. 10 consists in an additional step S51a which is completed if it is determined in step S81 that the measured amplitude is not bigger than the max_amplitude. In step S51a, the phase difference is modified by configuring a predecessor phase setting with respect to the storage place of the values of the phase difference in memory. This leads to a decrease of the actual phase difference used in generating the active load modulation signal.

Subsequently, the active load modulation signal is generated in step S61 using the newly configured phase setting and the amplitude of the test signal is measured at the antenna during its emission in step S71. Once again, the measured amplitude is compared to the max_amplitude. If the measured amplitude is bigger, then this amplitude is recorded as max_amplitude and the corresponding phase setting index is recorded as max_index. Then steps S51a, S61, S71 and S81 are repeated until the measured amplitude is smaller than the max_amplitude. In that case, step S91 is completed and the max_index is stored in non-volatile memory as described above.

This embodiment achieves a further acceleration of the determination of the phase difference value which leads to the maximum amplitude of the test signal.

In an exemplary implementation each of the various values of the phase difference stored in the frontend circuit is addressed via an index i. This index is set to zero at the beginning of the method in order to point to the preconfigured value of the phase difference. The corresponding amplitude of the test signal is measured. While the measured amplitude corresponding to an incremented value of the index i is bigger than the previously measured amplitude, measurement of the amplitude is continued. The index i is decremented. While the measured amplitude corresponding to a decremented value of the index i is bigger than the previously measured amplitude, measurement of the amplitude is continued. The index i is returned to the host component.

Figure 12:
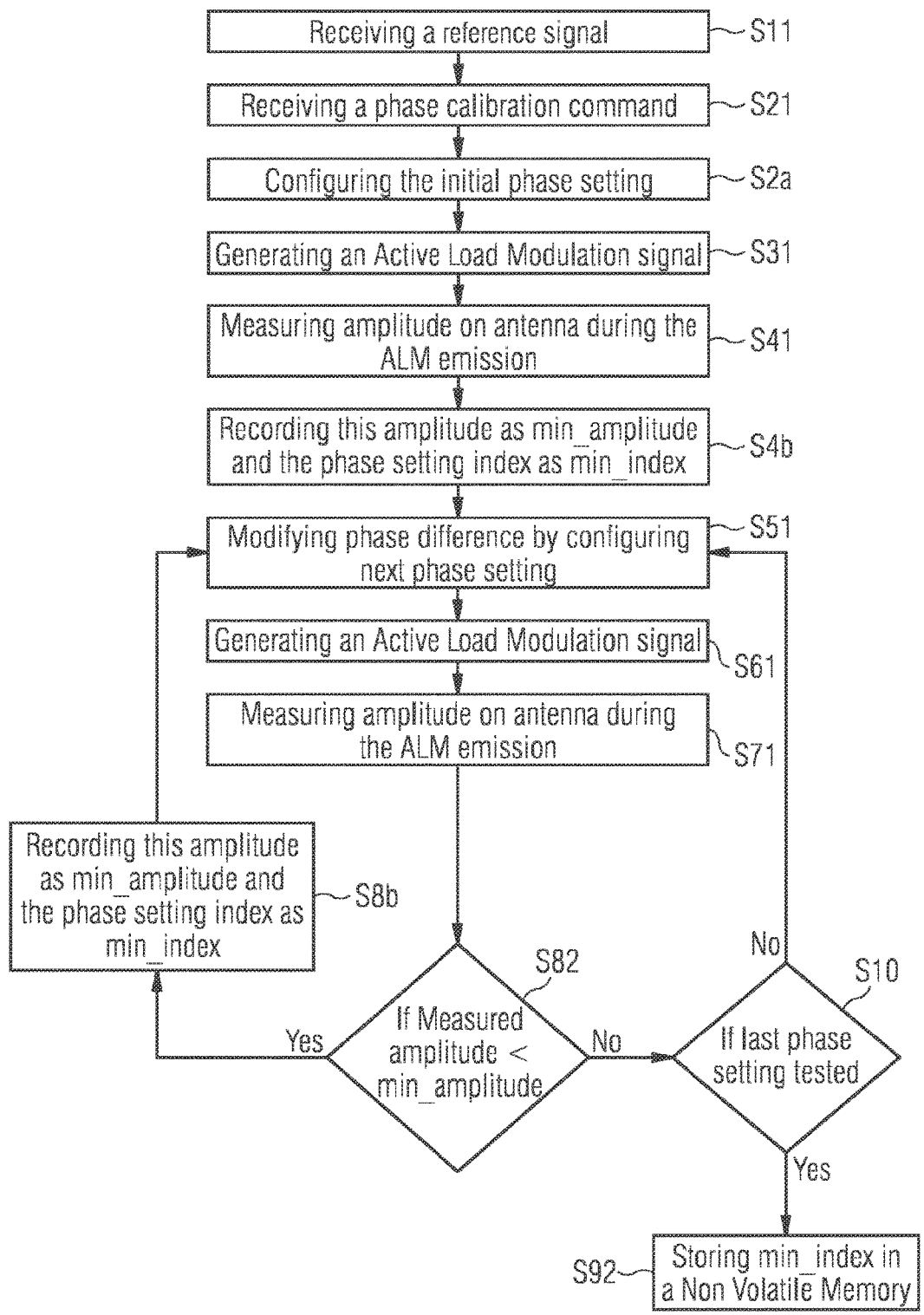
FIG. 12 shows a fourth exemplary embodiment of the method for a phase calibration according to the proposed principle.

FIG. 12 shows a fourth embodiment method of the present disclosure. In this embodiment the method is configured to determine the phase difference value which leads to the minimum amplitude of the test signal and thereby realizes a 180° phase shift between the active load modulation signal and the reference signal. This implements condition C2 as of FIG. 7.

Steps S11 to S41 correspond to steps S11 to S41 as described in FIGS. 10 and 11.

In contrast to FIGS. 11 and 10, in the present embodiment in step S4b the amplitude measured in step S41 is recorded as min_amplitude and an index of the corresponding value of the phase difference is recorded as min_index.

The method proceeds as described by modifying the phase difference by configuring the next phase setting and thereby increasing the phase difference in step S51, generating the active load modulation signal in step S61 and measuring the amplitude of the test signal at the antenna in step S71.

In step S82 the measured amplitude is compared to the min_amplitude. In case the measured amplitude is smaller than the min_amplitude, the measured amplitude is recorded as min_amplitude and the index of the corresponding phase setting is recorded as min_index in step S8b. Subsequently, steps S51, S61, S71 and S82 are repeated until the measured amplitude fulfills the predefined condition which in this case is the minimum amplitude as defined in FIG. 7.

As soon as the comparison in step S82 reveals that the measured amplitude is bigger than the min_amplitude, it is checked whether all available phase settings have been tested in step S10. Should this prove yes, the method proceeds with step S92 during which the min_index is stored in non-volatile memory.

In the opposite case, steps S51, S61, S71 and S82 are repeated until all possible values for the phase difference have been run through.

In the end, the min_index indicates the value of the phase difference which leads to a difference in phase of 180° between the active load modulation signal and the reference signal.

Figure 13:
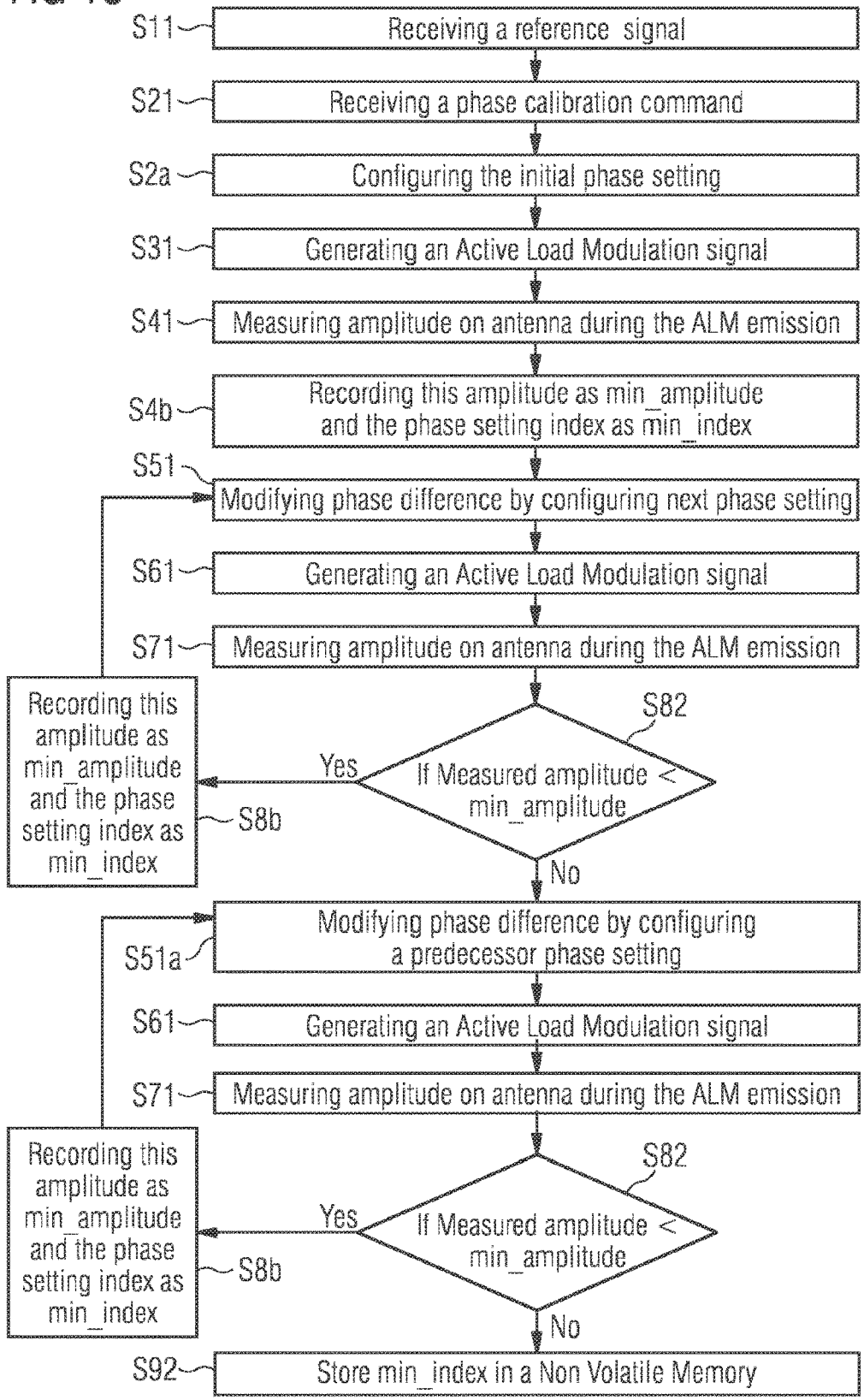
FIG. 13 shows a fifth exemplary embodiment of the method for a phase calibration according to the proposed principle.

FIG. 13 shows a fifth embodiment of a method according to the present disclosure. This embodiment is an alternative realization of the embodiment as described under FIG. 12 which determines the minimum amplitude of the test signal.

Steps S11, S21, S2a, S31, S41, S4b, S51, S61, S71 and S8b comply with the steps bearing the same numbers described in FIG. 12.

In step S82, the measured amplitude is compared with the min_amplitude. As long as the measured amplitude is smaller than the min_amplitude, the measured amplitude is recorded as min_amplitude and the corresponding phase setting index is recorded as min_index in step S8b and the steps S51, S61, S71 and S82 are repeated.

In the case that the measured amplitude is bigger than the min_amplitude, the phase difference value is modified in step S51a by configuring a predecessor phase setting which realizes a decrease in the phase difference. In step S61 the active load modulation signal is generated. The amplitude of the test signal is measured in step S71 and step S82 is subsequently performed. This second loop starting with S51a is repeated until the measured amplitude is bigger than the min_amplitude according to the comparison in step S82.

Consequently, when this condition is met, the min_index is stored in non-volatile memory in step S92.

Figure 14:
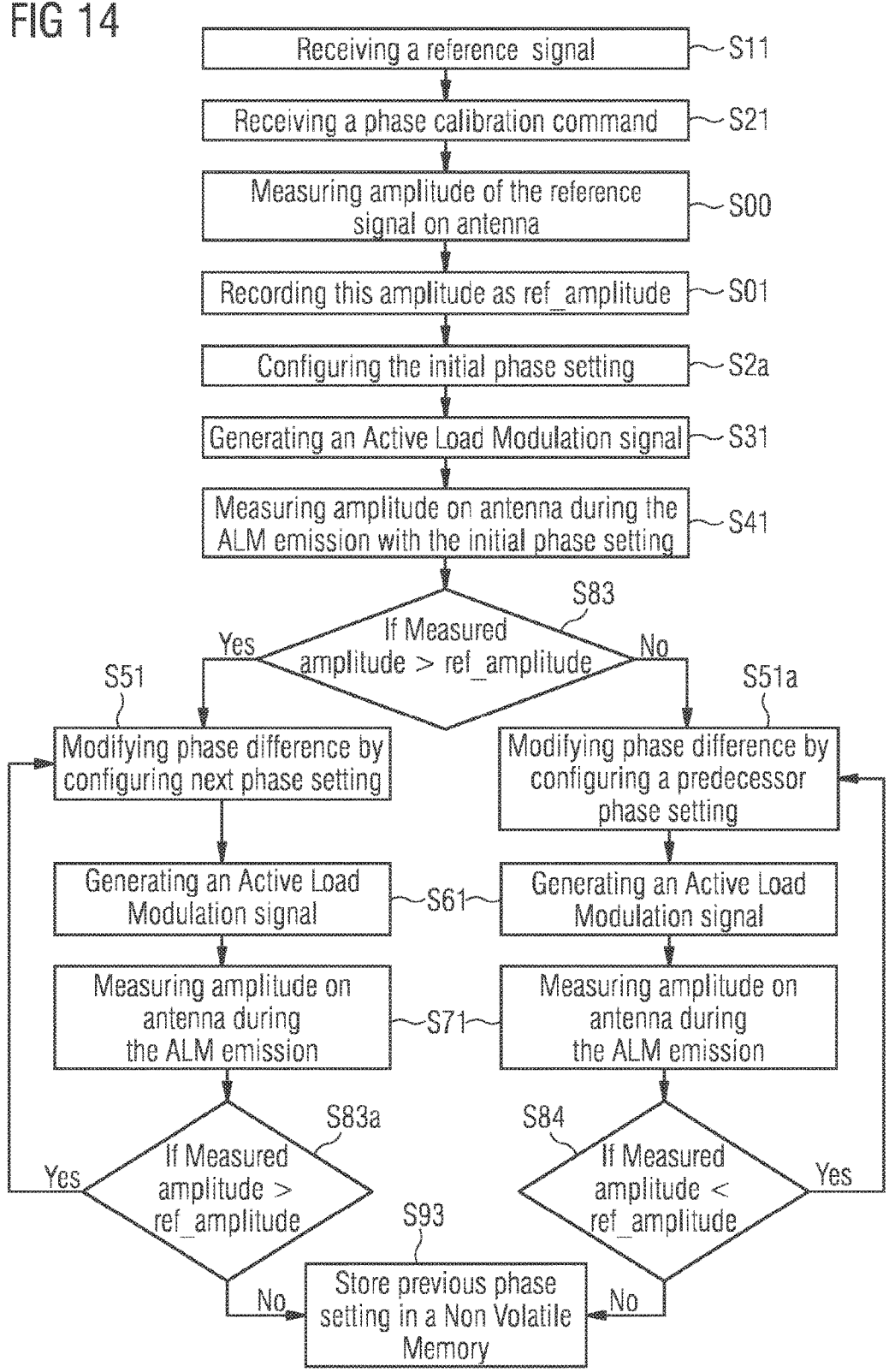
FIG. 14 shows a sixth exemplary embodiment of the method for a phase calibration according to the proposed principle.

FIG. 14 shows a sixth embodiment method according to the present disclosure. In this embodiment, the method is configured to determine an amplitude of the test signal which satisfies the condition of being equal to the reference amplitude which signifies a 90° phase shift between the active load modulation signal and the reference signal. This condition corresponds to condition C3 as described in FIG. 7.

The present embodiment also has steps S11 and S21 as described in the above embodiments, for example in FIG. 10.

After reception of the phase calibration command in step S21, the amplitude of the test signal at the antenna is measured in step S00. As the active load modulation signal is not yet emitted, the measured amplitude corresponds to the amplitude of the reference signal which represents the reference amplitude. In step S01, this amplitude is recorded as ref_amplitude.

The method proceeds with step S2a in which the initial phase setting is configured. In step S31, the active load modulation signal is generated.

In step S41, the amplitude of the test signal on the antenna of the tag device is measured.

In step S83, the measured amplitude is compared with the reference amplitude ref_amplitude. If the measured amplitude is bigger than the ref_amplitude, the phase difference is modified in step S51 by configuring the next phase setting which leads to an increase of the phase difference. Subsequently, the active load modulation signal is generated in step S61 and the resulting amplitude of the test signal is measured on the tag's antenna in step S71 during the active load modulation signal emission. In step S83a the measured amplitude is compared to the ref_amplitude. As long as the measured amplitude is bigger than the ref_amplitude, the steps S51, S61, S71 and S83a are repeated as depicted in FIG. 14. If the measured amplitude is smaller than the ref_amplitude, the loop is exited and the previous phase setting is stored in non-volatile memory in step S93.

If the comparison in step S83 reveals that the measured amplitude is bigger than the reference amplitude ref_amplitude, the phase difference is modified in step S51a by configuring a predecessor phase setting which decreases the phase difference. Subsequently, the active load modulation signal is generated in step S61 and the amplitude of the resulting test signal is measured in step S71. In step S84 the measured amplitude is compared to the reference amplitude ref_amplitude. As long as the measured amplitude is smaller than the ref_amplitude, steps S51a, S61, S71 and S84 are repeated in a loop.

If the comparison in step S84 reveals that the measured amplitude is bigger than the reference amplitude ref_amplitude, step S93 is performed and the previous phase setting is stored.

FIG. 15 shows a seventh embodiment method according to the present disclosure. In this embodiment, the method is configured to determine the amplitude of the test signal which corresponds to a 270° phase shift between the active load modulation signal and the reference signal. For this to be realized, the amplitude of the test signal shall correspond to the reference amplitude. This embodiment therefore implements condition C4 as described in FIG. 7.

Steps S11, S21, S00, S01, S2a, S31 and S41 correspond to the steps with the same numbers described under FIG. 14. However, for detection of the 270° phase shift point C4 as of FIG. 7, in contrast to the 90° phase shift point C3, the present embodiment first runs through step S84. This means that in step S84 it is tested if the measured amplitude is smaller than the ref_amplitude. Should this hold true, steps S51, S61, S71 and S83a are run through as depicted in the left-hand branch of FIG. 15. That means that the phase difference is stepwise increased until an amplitude is measured in the test signal that is bigger than the ref_amplitude. Subsequently, the previous phase setting is stored in non-volatile memory in step S93.

In the case in which in step S84 the measured amplitude is bigger that the ref_amplitude, steps S51a, S61, S71 and S84a are repeated in a loop, until an amplitude is measured which corresponds to the ref_amplitude which marks the exit condition. In the loop, according to step S51a, the phase difference is stepwise modified by decreasing the phase difference. Each time, an active load modulation signal is generated in step S61 using the configured phase setting of step S51a and the amplitude of the resulting test signal is measured in step S71. The measured amplitude is compared to the ref_amplitude. Should the measured be bigger than the ref_amplitude, the loop is exited and the previous phase setting is stored in non-volatile memory according to step S93.

In the description of FIGS. 10 to 15 the term "next phase setting" and the term "predecessor setting" refer to the order of values of phase differences which are stored in the frontend circuit. It is furthermore presumed that the values of the phase difference are stored in such an order that a monotonic increase in phase difference is realized from the first to the last stored value. This means that by choosing a next phase setting, the phase difference is increased, whereas by choosing a predecessor phase setting, the phase difference is decreased.

In contrast to this, the term "previous" represents a time relationship and refers to a previously performed measurement which is concluded prior to the actual measurement.

The described NFC tag may be used in an implementation of a contactless card device realizing, for example, a secure payment application.

The described method and frontend circuit are not limited to the ISO 144443 standard but can be applied to any NFC system which uses an amplitude load modulation and therefore requires exact calibration of the phase difference. Examples of such NFC systems are described in standards like Felica or ISO 15693.

The described method can alternatively be implemented using a dichotomic search algorithm or any other search algorithm as known in the art for determining the measured amplitude that fulfills the predefined condition. The dichotomic search is a divide and conquer algorithm which operates by selecting between two distinct alternatives, named dichotomies. This implementation allows speeding up the method even more. Instead of trying all values of phase differences to find the optimized setting, the values are divided into two equal groups and at each iteration of the algorithm, one group is discarded.

For instance when searching for an amplitude of the test signal which matches the amplitude of the reference signal in the cosine function depicted in FIG. 7, the algorithm e.g. tries two settings spaced by 180 degrees, for example at 210 and 30 degrees. 30 degrees will result in an amplitude of the test signal above the reference and the other one will result in an amplitude below the reference. Next, the setting in between is tried, i.e. 300 degrees. If for this setting the measured amplitude is above the reference Vref, then the settings within the range between 300 and 30 degrees are discarded and the search algorithm iterates on the range between 210 and 300 degrees.

What is claimed is:

1. A method of phase calibration of a near field communication (NFC) device, the method comprising:
   receiving a reference signal generated by an NFC signal generator device;
   generating an active load modulation signal with a phase difference with respect to the reference signal of the NFC signal generator device, the phase difference provided by a register of the NFC device;
   measuring an amplitude of a test signal present at an antenna of the NFC device, the test signal resulting from overlaying the reference signal with the active load modulation signal;
   modifying a value of the register until the measured amplitude fulfills a predefined condition; and
   storing a selected value that corresponds to the value of the register that fulfills the predefined condition.

2. The method of claim 1, wherein the predefined condition comprises the amplitude of the test signal being bigger than a predefined amplitude.

3. The method of claim 2, further comprising:
   recording a phase setting associated the amplitude of the test signal when the amplitude of the test signal is bigger than the predefined amplitude; and
   modifying the value of the register with a predecessor value when the amplitude of the test signal is smaller than the predefined amplitude.

4. The method of claim 1, wherein the predefined condition comprises the amplitude of the test signal being smaller than a predefined amplitude.

5. The method of claim 4, further comprising:
   recording a phase setting associated the amplitude of the test signal when the amplitude of the test signal is smaller than the predefined amplitude; and
   modifying the value of the register with a predecessor value when the amplitude of the test signal is bigger than the predefined amplitude.

6. The method of claim 1, wherein the predefined condition comprises the amplitude of the test signal being substantially equal to a predefined amplitude.

7. The method of claim 6, further comprising:
   when an initial amplitude of the test signal is bigger than the predefined amplitude, iterating in a forward direction through values of the register until the amplitude of the test signal is smaller than the predefined amplitude; and
   when the initial amplitude of the test signal is bigger than the predefined amplitude, iterating in a reverse direction through values of the register until the amplitude of the test signal is bigger than the predefined amplitude.

8. The method of claim 1, wherein modifying the value of the register comprises iterating over all possible values of the register.

9. The method of claim 1, further comprising receiving a phase calibration command before generating the active load modulation signal.

10. The method of claim 1, wherein storing the selected value of the register comprises storing the selected value of the register in a frontend circuit of the NFC device.

11. The method of claim 1, wherein storing the selected value of the register comprises storing the selected value of the register in non-volatile memory.

12. A device comprising:
    a matching circuit configured to be coupled to an antenna;
    a front end circuit coupled to the matching circuit, the front end circuit comprising:
    a receiver configured to receive a reference signal generated by an NFC signal generator device;
    an antenna driver configured to generate an active load modulation signal with a phase difference with respect to the reference signal of the NFC signal generator device, the phase difference provided by a register of the NFC device;
    a measurement circuit configured to measure an amplitude of a test signal present at an antenna of the NFC device, the test signal resulting from overlaying the reference signal with the active load modulation signal; and
    a control circuit configured to modify a value of the register until the measured amplitude fulfills a predefined condition, and to store a selected value that corresponds to the value of the register that fulfills the predefined condition.

13. The device of claim 12, wherein the predefined condition comprises the amplitude of the test signal being bigger than a predefined amplitude.

14. The device of claim 13, wherein the control circuit is further configured to modify the value of the register with a predecessor value when the amplitude of the test signal is smaller than the predefined amplitude.

15. The device of claim 12, wherein the predefined condition comprises the amplitude of the test signal being substantially equal to a predefined amplitude.

16. The device of claim 12, further wherein the matching circuit is coupled to the receiver via coupling capacitors.

17. The device of claim 12, further comprising the antenna, the matching circuit coupled to the antenna.

18. The device of claim 12, wherein the measurement circuit comprises an analog-to-digital converter (ADC).

19. A system comprising:
    an antenna;

a matching circuit coupled to the antenna;
a front end circuit coupled to the matching circuit, the front end circuit comprising:
  a receiver configured to receive a reference signal generated by an NFC signal generator device, wherein the receiver is coupled to the antenna via coupling capacitors;
  an antenna driver coupled to the antenna via the matching circuit, the antenna driver configured to generate an active load modulation signal with a phase difference with respect to the reference signal of the NFC signal generator device, the phase difference provided by a register of the NFC device;
  a measurement circuit coupled to the receiver and configured to measure an amplitude of a test signal present at an antenna of the NFC device, the test signal resulting from overlaying the reference signal with the active load modulation signal; and
  a control circuit configured to modify a value of the register until the measured amplitude fulfills a predefined condition, and to store a selected value that corresponds to the value of the register that fulfills the predefined condition.

20. The system of claim 19, wherein the system is a mobile phone.

* * * * *